(12) United States Patent
Kataoka et al.

(10) Patent No.: US 10,040,480 B1
(45) Date of Patent: Aug. 7, 2018

(54) LANE KEEPING TRAVELING SUPPORT APPARATUS

(71) Applicant: TOYOTA JIDOSHA KABUSHIKI KAISHA, Toyota-shi, Aichi (JP)

(72) Inventors: Hiroaki Kataoka, Toyota (JP); Kazuma Hashimoto, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/869,938

(22) Filed: Jan. 12, 2018

(30) Foreign Application Priority Data

Jan. 17, 2017 (JP) ................. 2017-005970

(51) Int. Cl.
| | |
|---|---|
| *B62D 6/08* | (2006.01) |
| *B62D 15/02* | (2006.01) |
| *B62D 5/04* | (2006.01) |
| *G06K 9/00* | (2006.01) |
| *G06T 7/60* | (2017.01) |
| *G06K 9/20* | (2006.01) |
| *G08G 1/16* | (2006.01) |

(52) U.S. Cl.
CPC ......... *B62D 15/025* (2013.01); *B62D 5/0463* (2013.01); *B62D 6/08* (2013.01); *G06K 9/00798* (2013.01); *G06K 9/209* (2013.01); *G06T 7/60* (2013.01); *G06T 2207/30204* (2013.01); *G06T 2207/30256* (2013.01); *G08G 1/167* (2013.01)

(58) Field of Classification Search
CPC ...... B62D 15/025; B62D 5/0463; B62D 6/08; G06T 7/60; G06T 2207/30204; G06T 2207/30256; G06K 9/00798; G06K 9/209; G08G 1/167
See application file for complete search history.

(56) References Cited

U.S. PATENT DOCUMENTS

| | | | |
|---|---|---|---|
| 2004/0102884 A1* | 5/2004 | Tange | B60K 31/0066 701/48 |
| 2004/0262063 A1* | 12/2004 | Kaufmann | B62D 1/286 180/169 |
| 2012/0226392 A1 | 9/2012 | Kataoka | |

FOREIGN PATENT DOCUMENTS

WO        2011/064825 A1        6/2011

* cited by examiner

*Primary Examiner* — Richard M Camby
(74) *Attorney, Agent, or Firm* — Oliff PLC

(57) ABSTRACT

A lane keeping traveling support apparatus includes a driving support ECU. The driving support ECU is configured to to determine a lane departure prevention torque in such a manner that a magnitude of the lane departure prevention torque becomes smaller or to stop performing a lane departure prevention control, when the lane departure prevention control is performed in place of a lane keeping assist control and a specific operation of a steering wheel is performed by a driver so as to have a direction of an own vehicle head to a lane departure direction.

4 Claims, 8 Drawing Sheets

LANE KEEPING TRAVELING SUPPORT APPARATUS

BACKGROUND OF THE INVENTION

1. Field of the Invention

The present invention relates to a lane keeping traveling support apparatus which controls a steering assist torque in such a manner that a vehicle (own vehicle) does not deviate from a lane where the own vehicle is traveling.

2. Description of the Related Art

A lane keeping traveling support apparatus, which has been conventionally known, recognizes lane markers such as a white line or a yellow line on a road by using a camera sensor mounted on an own vehicle to control a steering assist torque in such a manner that the own vehicle travels at an appropriate position within a "traveling lane (lane) specified by the recognized lane markers" (for example, refer to WO 2011/064825). Hereinafter, the conventional lane keeping traveling support apparatus is also referred to as a "conventional apparatus". A lane keeping assist control and a lane departure prevention control are known as a control to realize a typical lane keeping traveling support (lane keeping assist) performed by the conventional apparatus.

When the conventional apparatus performs the lane keeping assist control, for example, the conventional apparatus detects the left and right white lines by the camera sensor and sets/determines a center line which is positioned at a central position between the left white line and the right white line as a target traveling line. Further, the conventional apparatus supports a steering operation of a driver by applying the steering assist torque to a steering mechanism in such a manner that a position of the own vehicle is kept in the vicinity of the target traveling line. It should be noted that such a lane keeping assist control is referred to as an "LKA (Lane Keeping Assist) control".

On the other hand, while the conventional apparatus performs the lane departure prevention control, the conventional apparatus generates a warning to the driver when the own vehicle is likely to deviate from the traveling lane, and supports the steering operation of the driver by applying the steering assist torque to the steering mechanism so as to prevent the own vehicle from deviating from the traveling lane.

It should be noted that such a lane departure prevention control is also referred to as an "LDA (Lane Departure Alert) control with a steering control" or simply as an "LDA control".

SUMMARY OF THE INVENTION

The lane keeping assist control is a control to have a vehicle smoothly travel along the target traveling line. Therefore, while the lane keeping assist control is performed, for example, an upper limit value is set for limigitng the steering assist torque (that is, a control amount changed by the lane keeping assist control) in such a manner that a lateral acceleration and/or a yaw rate change rate of the vehicle do/does not become excessive. Therefore, for example, in a situation where the speed of the vehicle traveling in a curve section is excessively high, and/or in a situation where a disturbance (a cross/side wind, a road surface inclination, and the like) is excessively serious, a case may arise where the steering assist torque by the lane keeping assist control reaches the upper limit value.

When the steering assist torque reaches the upper limit value, the conventional apparatus can not keep a traveling position of the own vehicle close to the target traveling line by the lane keeping assist control. As a result, a case arises where the own vehicle deviates from the traveling lane. In view of this, in such a case, the conventional apparatus starts the lane departure prevention control to generate a "relatively large steering assist torque" which exceeds the upper limit value in the lane keeping assist control so that the own vehicle does not deviate from the traveling lane, when the own vehicle excessively approaches an end of the traveling lane (for example, one of a pair of the left and right white lines).

On the other hand, when the own vehicle excessively approaches the end of the traveling lane due to an intentional steering operation (steering wheel operation) by the driver to change lanes while the lane keeping assist control is being performed, the conventional apparatus also starts the lane departure prevention control to generate the relatively large steering assist torque similar to the above.

However, since a steering direction of the steering assist torque is opposite to a steering direction of the driver's intentional steering operation to cause the own vehicle to deviate from the traveling lane, the lane departure prevention control does not follow (is not along with) the driver's intention.

When the lane departure prevention control is performed in a manner that the lane departure prevention control is not along with the intention of the driver as described above, the driver is highly likely to feel discomfort. In other words, it can be said that it is difficult for the conventional apparatus to work along with the intention of the steering operation performed by the driver to change the traveling direction of the own vehicle (that is, the conventional apparatus is an apparatus having a low acceptability for intentional steering operation by the driver).

The present invention has been made in order to solve the above-described problem. That is, one of objects of the present invention is to provide a lane keeping traveling support apparatus which has a high acceptability for the intentional steering operation of the driver. Hereinafter, the lane keeping traveling support apparatus according to the present invention is also referred to as a "present invention apparatus".

The present invention apparatus comprises:
an electric motor for (21) applying a steering assist torque to a steering mechanism for changing a turning angle of steered wheels of an own vehicle;
a lane recognition section (11):
  for recognizing a pair of lane markers that defines a traveling lane in which the own vehicle is traveling;
  for setting a target traveling line based on the lane markers; and
  for obtaining lane information including a position and a direction of the own vehicle with respect to the lane markers and the target traveling line; and
a control unit (10) for selectively performing one of:
  a lane keeping assist control and a lane departure prevention control.
The lane keeping assist control is a control:
for determining a lane keeping support torque which is the steering assist torque to keep a traveling position of the own vehicle in the vicinity of the target traveling line based on the lane information; and for applying the determined lane keeping support torque to the steering mechanism by using the electric motor.

The lane departure prevention control:

for determining, based on said lane information, a lane departure prevention torque which is the steering assist torque to change a direction of the own vehicle to a direction opposite to a lane departure direction which is a direction of the own vehicle when deviating from the traveling lane so as to prevent the own vehicle from deviating from the traveling lane, when a specific traveling situation occurs in which the own vehicle is likely to deviate from the traveling lane to outside of the traveling lane, the lane departure prevention torque having a magnitude larger than a magnitude of the lane keeping support torque determined when it is assumed that the lane keeping support control is being performed under the specific traveling situation; and for applying the determined lane departure prevention torque to the steering mechanism by using the electric motor.

The control unit is configured to perform the lane departure prevention control instead of the lane keeping assist control (step 770 shown in FIG. 7), when the specific driving situation occurs while the lane keeping support control is being performed by the control unit (refer to a "Yes" determination at step 840 shown in FIG. 8).

The control unit is configured to:

determine the lane departure prevention torque (step 760 shown in FIG. 7), when the specific driving situation occurs and a specific operation of a steering wheel (SW) is performed by the driver so as to have the direction of the own vehicle head to the lane departure direction (refer to a "Yes" determination at step 745 shown in FIG. 7), in such a manner that a magnitude of the lane departure prevention torque becomes smaller than a magnitude of the lane departure prevention torque when the specific operation of the steering wheel is not performed by the driver; or stop performing the lane departure prevention control, when the specific driving situation occurs and the specific operation of the steering wheel is performed by the driver.

When the specific traveling situation occurs in which the own vehicle is likely to deviate from the traveling lane to the outside of the traveling lane and the specific operation of the steering wheel is performed by the driver so as to have the own vehicle head/direct to the lane departure direction, the present invention apparatus determines the lane departure prevention torque in such a manner that the magnitude of the lane deviation prevention torque becomes smaller than a magnitude of the lane departure prevention torque when the specific operation of the steering wheel is not performed by the driver, or stops performing the lane departure prevention control. Thereby, it is possible to reduce the possibility that the LDA control causes the driver to feel uncomfortable. As a result, the present invention apparatus can increase acceptability for the intentional steering operation of the driver.

In one of aspects of the present invention apparatus, the control unit is configured, when performing the lane departure prevention control:

to determine a reference LDA target torque which is a basic value of the lane departure prevention torque based on the lane information (step 740 shown in FIG. 7);

to calculate a corrected LDA target torque by multiplying the reference LDA target torque by an LDA control gain larger than 0 and smaller than 1 (step 760 shown in FIG. 7), when the specific driving situation occurs and the specific operation of the steering wheel is performed by the driver (refer to a "Yes" determination at step 745 shown in FIG. 7); and to set the reference LDA target torque as the corrected LDA target torque (steps 765 and 760 shown in FIG. 7), when the specific driving situation occurs and the specific operation of the steering wheel is not performed by the driver (refer to a "No" determination at step 745 shown in FIG. 7); and to use the corrected LDA target torque as the lane departure prevention torque (step 775 shown in FIG. 7).

According to the above aspect, when the above specific driving situation occurs, and when the specific operation of the steering wheel is performed by the driver, the control amount of the lane departure prevention is decreased (or an effect of the lane departure prevention is weakened). Thereby, the possibility that the lane departure prevention control causes the driver to feel uncomfortable can be reduced. Therefore, the above aspect can increase the acceptability for the intentional steering operation of the driver.

In one of aspects of the present invention apparatus, the control unit is configured, when the specific driving situation occurs and the specific operation of the steering wheel is performed by the driver (refer to a "Yes" determination at step 745 shown in FIG. 7):

to stop performing the lane departure prevention control; and to perform the lane keeping assist control instead of the stopped lane departure prevention control.

According to the above aspect, when the above specific driving situation occurs, and when the specific operation of the steering wheel is performed by the driver, the lane departure prevention control is stopped. Thereby, the possibility that the lane departure prevention control causes the driver to feel uncomfortable can be reduced. Therefore, it can increase the acceptability for the intentional steering operation of the driver.

In one of aspects of the present invention apparatus, the control unit is configured, when performing the lane keeping assist control:

to calculate a reference LKA target torque which is a basic value of the lane keeping support torque based on the lane information (step 710 shown in FIG. 7);

to calculate a corrected LKA target torque by multiplying the reference LKA target torque by a LKA control gain which becomes smaller within a range from 0 to 1 as a magnitude of a driver torque which is a torque applied to the steering wheel by the driver increases (step 720 shown in FIG. 7); and to use the corrected LKA target torque as the lane keeping support torque (step 780 shown in FIG. 7).

According to the above aspect, the lane keeping assist control decreases the magnitude of the steering assist torque for causing the own vehicle to travel along the target traveling line by the lane keeping assist control. That is, the control effect of the lane keeping assist control is weakened. As a result, when the driver is performing the specific steering operation with the intention to change lanes, the specific steering wheel operation to have the own vehicle turn/head to the lane departure direction can be performed with a light force. Therefore, the possibility that the lane keeping assist control causes the driver to feel uncomfortable can be reduced.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE PREFERRED EMBODIMENT

A lane keeping traveling support apparatus (hereinafter, referred to as a "present apparatus") according to an embodiment of the present invention will be described below, referring to figures.

(Construction)

Figure 1:
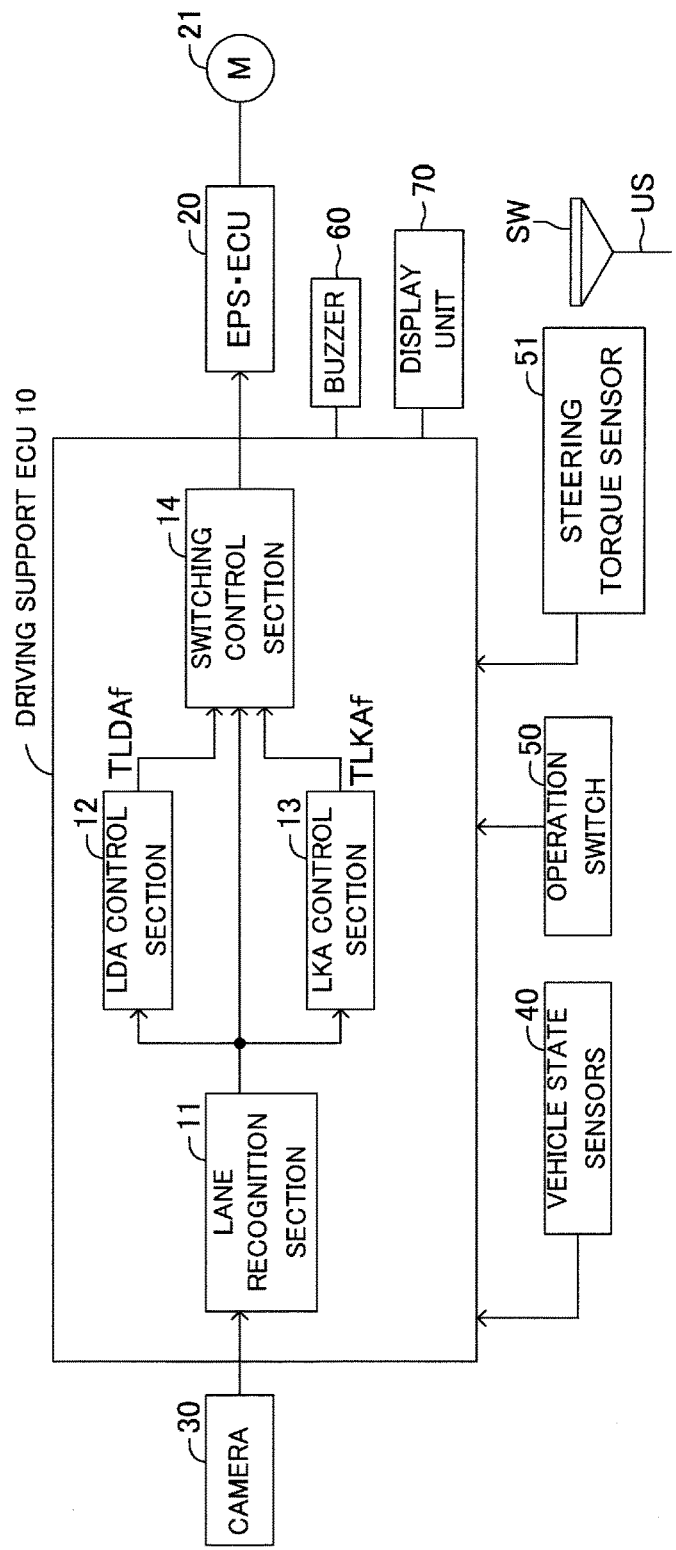
FIG. 1 is a schematic system configuration diagram of a lane keeping traveling support apparatus according to an embodiment of the present invention.

The present apparatus is applied to a vehicle (not shown). In the present specification, in order to distinguish the vehicle to which the present apparatus is applied from other vehicles, the vehicle to which the present apparatus is applied may be referred to as an "own vehicle". As shown in FIG. 1, the present apparatus comprises a driving support ECU 10, an electric power steering ECU 20, a camera 30, vehicle state sensors 40, an operation switch 50, a steering torque sensor 51, a buzzer 60, and a display unit (indicator) 70. Hereinafter, the electric power steering ECU 20 is referred to as an "EPS•ECU (Electric Power Steering ECU) 20".

It should be noted that the ECU is an abbreviation of an Electric Control Unit, and is an electronic control circuit having a microcomputer including a CPU, a ROM, a RAM, an interface, and the like as its main components. The CPU realizes various functions by executing instructions (routines) stored in a memory (ROM).

Focusing on functions of the microcomputer, the driving support ECU 10 is roughly divided into a lane recognition section 11, a lane departure prevention control section 12, a lane keeping assist control section 13, and a switching control section 14. The driving support ECU 10 calculates a target torque (a control amount) for a lane keeping traveling support by using these functions. The driving support ECU 10 transmits a steering command including a signal representing the target torque to the EPS•ECU 20.

The EPS•ECU 20 is a control apparatus of an electric power steering apparatus, and mainly includes a microcomputer and a motor drive circuit. The EPS•ECU 20 obtains a steering torque (hereinafter, also referred to as a "driver torque TqDr") applied to a steering wheel SW by a driver, using the steering torque sensor 51 provided on a steering shaft US, when a lane keeping traveling support which will be described later is not being performed. Further, the EPS•ECU 20 drives an assist motor 21 which is an electric motor based on the obtained driver torque TqDr, thereby applying a steering assist torque to a steering mechanism to assist a steering wheel operation of the driver. In the embodiment, it should be noted that the driver torque TqDr is a positive value when the driver torque TqDr is a torque in a direction in which the own vehicle generates a yaw rate in a left turning direction. The driver torque TqDr is a negative value when the driver torque TqDr is a torque in a direction in which the own vehicle generates a yaw rate in a right turning direction.

The EPS•ECU 20 is connected with the driving support ECU 10. When the EPS•ECU 20 receives the steering command from the driving support ECU 10, the EPS•ECU 20 drives the assist motor 21 based on the target torque specified by the steering command, thereby generating the steering assist torque equal to the target torque. This steering assist torque is different from the steering assist torque applied for assisting the steering wheel operation of the driver. This steering assist torque is the assist torque applied to the steering mechanism based on the steering command transmitted from the driving support ECU 10.

The vehicle state sensors 40 include a vehicle speed sensor for detecting the vehicle speed of the own vehicle, a yaw rate sensor for detecting a yaw rate of the own vehicle, a lateral acceleration sensor for detecting a lateral acceleration of the own vehicle, and the like. The vehicle state sensors 40 are used to acquire information necessary for calculating the target torque for the lane keeping assist.

The lane recognition section 11 is connected with the camera 30 which is a stereo camera. The camera 30 photographs (takes an image of) an area ahead of the own vehicle and transmits an image data acquired by photographing to the lane recognition section 11. The lane recognition section 11 recognizes (detects) lane markers such as left and right white lines (each of which includes a continuous line and a dashed line), left and right yellow lines, or the like, on a road by analyzing the image data transmitted from the camera 30. Hereinafter, the lane marker is referred to as a "white line" for convenience.

Figure 2:
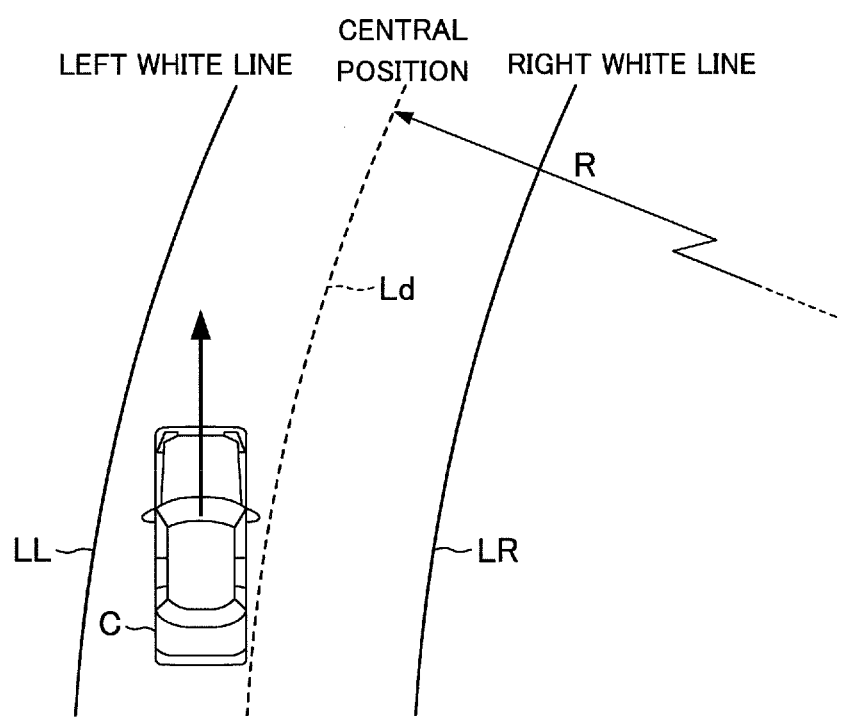
FIG. 2 is a plan view showing left and right white lines LL and LR, a target traveling line Ld, and a curve radius R.

As shown in FIG. 2, the lane recognition section 11 recognizes a left white line LL and a right white line LR and sets/determines a center line which is positioned at the center between the left white line LL and the right white line LR as a target traveling line Ld. Further, the lane recognition section 11 calculates a curve radius R of the target traveling line Ld. It should be noted that the target traveling line Ld is not necessarily set at the central position of the left and right white lines. The target traveling line Ld may be set at a position shifted from the center position in the left or the right direction by a "predetermined distance which is sufficiently short as compared with a lane width".

Figure 3:
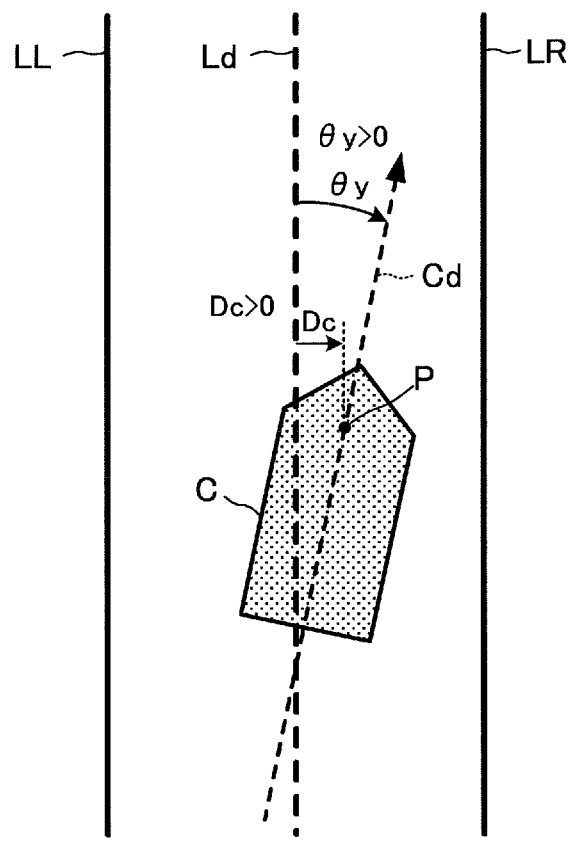
FIG. 3 is a plan view showing, a center distance Dc, and a yaw angle θy, serving as lane information for a lane keeping assist control.

The lane recognition section 11 calculates a position and a direction of the own vehicle C in the traveling lane defined by the left white line LL and the right white line LR. More specifically, the lane recognition section 11 calculates "a center distance Dc and a yaw angle θy" defined below and shown in FIG. 3. It should be noted that a reference point P of the own vehicle C is the central position between the left and right front wheels on an axle of the left and right front wheels of the own vehicle C.

The center distance Dc: the center distance Dc is a distance Dc in a road width direction (lateral direction) between the reference point P and the target traveling line Ld. In the present embodiment, the center distance Dc is "0" when the reference point P is on the target traveling line Ld. The center distance Dc is a positive value when the reference point P is in the right side of the target traveling line Ld. The center distance Dc is a negative value when the reference point P is in the left side of the target traveling line Ld.

The yaw angle θy: the yaw angle θy is an angle (deviation angle) formed between the direction of the target traveling line Ld and a direction Cd in which the own vehicle C heads, and is an acute angle from −90° to +90°. In the present embodiment, the yaw angle θy is "0" when the direction Cd (the own vehicle C heading direction) coincides with the direction of the target traveling line Ld. The yaw angle θy is a positive value when the direction Cd of the own vehicle C inclines in the clockwise direction (the direction shown in FIG. 3) with respect to the direction of the target traveling line Ld. The yaw angle θy is a negative value when the direction Cd of the own vehicle C inclines in the counter-clockwise direction (the direction shown in FIG. 4A) with respect to the direction of the target traveling line Ld.

Figure 4A:
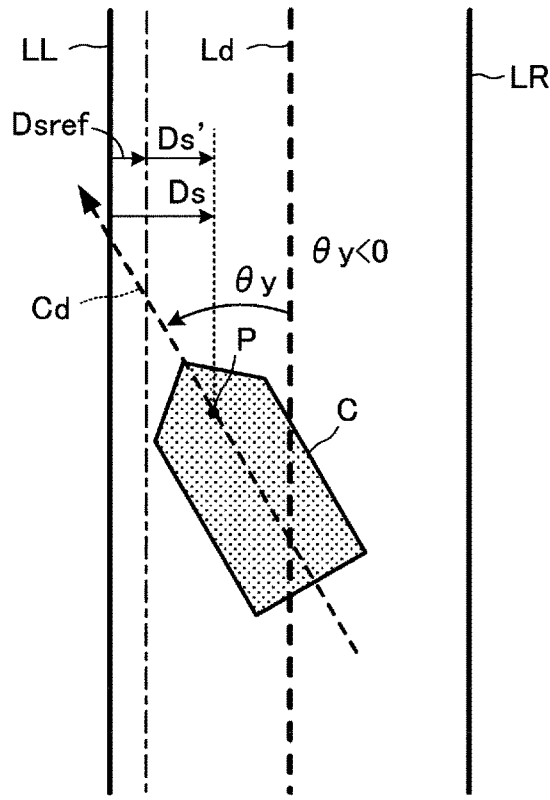
FIG. 4A is a plan view showing a side distance Ds and a yaw angle θy, serving as lane information for a lane departure prevention control is performed.

Further, the lane recognition section 11 calculates a side distance Ds defined below and shown in FIG. 4A.

The side distance Ds: the side distance Ds is a distance in the road width direction between the "reference point P" and a "white line to which the reference point P of the own vehicle C is closer among the right white line LR and the left white line LL". Hereinafter, the white line to which the reference point P of the own vehicle C is closer is referred to as an "objective (or target) white line" for convenience. In the example shown in FIG. 4A, the objective white line is the left white line LL. In the present embodiment, the side distance Ds is "0" when the reference point P is on the objective white line. The side distance Ds is a positive value when the reference point P is inside the traveling lane with respect to the objective white line (at a position in the center side of the road). The side distance Ds is a negative value when the reference point P is outside the traveling lane with respect to the objective white line (at a position in the side departing from the road).

The values (Dc, Ds, By, R) calculated by the lane recognition section 11 are referred to as lane information.

The lane departure prevention control section 12 performs the lane departure prevention control. The lane departure prevention control is a control for applying the steering assist torque to the steering mechanism in such a manner that the own vehicle does not deviate from the traveling lane when the own vehicle is about to deviate from the traveling lane to the outside of the traveling lane, so as to support a steering operation of the driver (steering operation) with alerting the driver. Hereinafter, the lane departure prevention control section 12 is referred to as an "LDA control section 12" and the lane departure prevention control is referred to as an "LDA control".

The LDA control section 12 receives the lane information (Ds, θy, R) calculated by the lane recognition section 11 to calculate a target torque for preventing the own vehicle from deviating from the traveling lane to the outside of the traveling lane. Hereinafter, the calculated target torque is also referred to as an "LDA target torque". As will be described later, the LDA target torque includes a reference LDA target torque TLDAs and a corrected LDA target torque TLDAf. In the embodiment, the LDA target torque TLDA is a positive value when the LDA target torque TLDA is a torque in a direction in which the own vehicle generates a yaw rate in a left turning direction. The LDA target torque TLDA is a negative value when the LDA target torque TLDA is a torque in a direction in which the own vehicle generates a yaw rate in a right turning direction. In this regard, the same applies not only to "the reference LDA target torque TLDAs and the corrected LDA target torque TLDAf" but also to "a reference LKA target torque TLKAs and a corrected LKA target torque TLKAf" both of which will be described later.

When and after an LDA calculation start condition described below is satisfied, the LDA control section 12 calculates the reference LDA target torque TLDAs using a following formula (1) until an LDA calculation termination condition is satisfied. When the LDA control section 12 does not calculate the LDA target torque TLDAs using the formula (1), the LDA control section 12 provisionally sets the reference LDA target torque TLDAs to "0".

The LDA calculation start condition: the LDA calculation start condition is a condition which is satisfied when the side distance Ds becomes equal to or shorter/smaller than a reference side distance Dsref and when an operating condition of an lane keeping traveling support mode is satisfied.

The LDA calculation termination condition: the LDA calculation termination condition is a condition which is satisfied when both of following conditions (a) and (b) are satisfied.

(a) The side distance Ds is longer/greater than the reference side distance Dsref.

(b) The yaw angle θy is equal to or greater than a "negative switching determination threshold value θyrefF" when the objective white line is the left white line LL, or the yaw angle θy is smaller than or equal to a "positive switching determination threshold value θyrefS" when the objective white line is the right white line LR.

Each of the switching determination threshold value θyrefF and the switching determination threshold value θyrefS is set to an angle which allows the direction of the own vehicle C to be regarded as being roughly parallel (substantially parallel) to the target traveling line Ld.

$$TLDAs = K1 \cdot (V^2/R) + K2 \cdot Ds' + K3 \cdot \theta y \qquad (1)$$

Here, each of K1, K2, and K3 is a control gain.

K1 is set to a positive value (k1>0) when the traveling lane curves to the left, and is set to a negative value (−k1) when the traveling lane curves to the right.

K2 is set to a positive value (k2>0) when the objective white line is the right white line LR, and is set to a negative value (−k2) when the objective white line is the left white line LL.

K3 is set to a positive value.

V is the vehicle speed of the own vehicle detected by the vehicle speed sensor.

R is the curve radius (R>0) of the target traveling line Ld calculated by the lane recognition section 11.

θy is the above-described yaw angle.

Figure 4B:
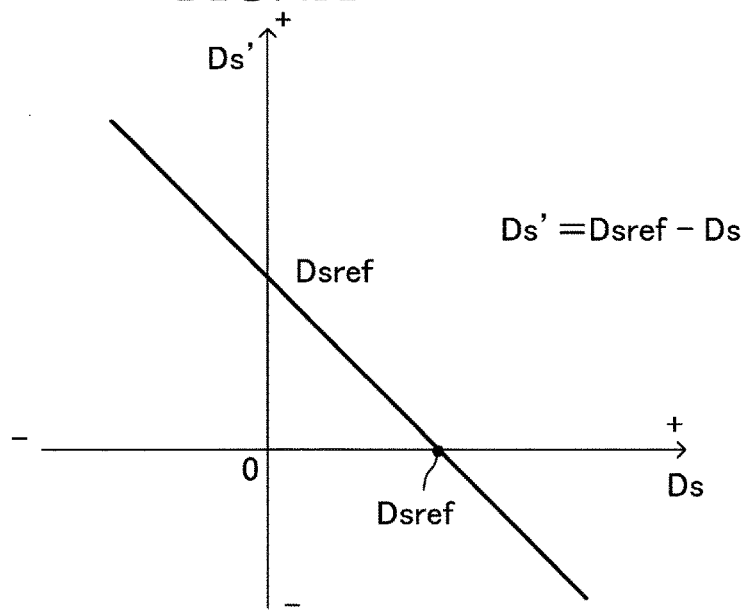
FIG. 4B is a graph showing relationship between a deviation indicator distance Ds' and the side distance Ds.

Ds' is a departure indicator distance Ds' which is a value (Ds'=Dsref−Ds) obtained by subtracting the side distance Ds from the preset reference side distance Dsref. The departure indicator distance Ds' has relationship shown in a graph of FIG. 4B with respect to the side distance Ds.

The first term on the right side of the formula (1) is a torque component (feedforward control amount with respect to the curve radius R) determined according to the curve radius R of the road (target traveling line Ld) and the vehicle speed V. The torque component acts in a feedforward control manner with respect to the curve radius R. That is, the first term on the right side of the formula (1) is the torque component to have the own vehicle C travel according to a curvature of the target traveling line Ld.

The second term on the right side of the formula (1) is a torque component which acts in a feedback control manner so that the own vehicle C does not excessively approach the white line (in particular, the objective white line) in the road width direction, or so that the own vehicle C travels at the inner side (road center side) with respect to the objective white line after the own vehicle C has deviated from the traveling lane. The second term is a feedback control amount with respect to the side distance Ds or with respect to the departure indicator distance Ds'.

The third term on the right side of the formula (1) is a torque component (feedback control amount with respect to the yaw angle $\theta y$) which acts in a feedback control manner so as to reduce a magnitude $|\theta y|$ of the yaw angle $\theta y$ (i.e., so as to reduce a deviation of the direction of the own vehicle with respect to the target traveling line Ld).

It should be noted that the LDA control section 12 may obtain/acquire the reference LDA target torque TLDAs by adding a value $K4\cdot(\gamma^*-\gamma)$ to the right side of the above formula (1) (i.e., TLDAs=$K1\cdot(V^2/R)+K2\cdot Ds'+K3\cdot\theta y+K4\cdot(\gamma^*-\gamma)$).

K4 is a positive gain (control gain).

$\gamma^*$ is the target yaw rate, and is the yaw rate to be achieved/realized based on the sum of the first term of the right side, the second term of the right side, and the third term of the right side.

$\gamma$ is an actual yaw rate of the own vehicle C detected by the yaw rate sensor.

Therefore, the value $K4\cdot(\gamma^*-\gamma)$ is a torque component (feedback amount with respect to the yaw rate) which acts in a feedback control manner so as to reduce a deviation between the target yaw rate $\gamma^*$ and the actual yaw rate $\gamma$.

Here, the following situation is considered, where the own vehicle C is about to deviate from the right white line LR of the traveling lane (in other words, the side distance Ds has become equal to or smaller than the reference side distance Dsref) when the own own vehicle C is traveling at a constant speed V along the target traveling line Ld curving to the left and having a constant curve radius R which is excessively small with respect to the vehicle speed V. In this case, since the control gain K2 is set to the positive value k2 and the departure indicator distance Ds' becomes a positive value, the second term (K2·Ds') on the right side of the formula (1) becomes a positive value. Further, the control gain K3 is set to the positive value and the yaw angle $\theta y$ becomes a positive value because the own vehicle is about to depart from the right white line LR. Thus, the third term (K3·$\theta y$) on the right side of the formula (1) also becomes a positive value. In addition, at the beginning of the tendency of the own vehicle C (that is, the departure tendency) when deviating from the right white line LR, the deviation indicator distance Ds' and the yaw angle $\theta y$ increase. That is, the deviation indicator distance Ds' and the yaw angle $\theta y$ can be said to be parameters whose absolute values increase as the possibility that the own vehicle C deviates from the traveling lane increases.

Meanwhile, the LDA control section 12 calculates the reference LDA target torque TLDAs each time a predetermined time elapses. The control gain K2 and the control gain K3 are control gains each of which is multiplied by the parameter whose absolute value becomes larger as the possibility that the own vehicle C deviates from the traveling lane increases. Therefore, a change amount of the reference LDA target torque TLDAs per unit time becomes larger as the absolute value of each of these control gains is larger. That is, the responsiveness of the LDA control can be more enhanced as the absolute values of these control gains are larger.

Further, as will be described later, the LDA control section 12 calculates the corrected LDA target torque TLDAf by multiplying the reference LDA target torque TLDAs calculated according to the formula (1) by the LDA control gain GLDA. This point will be described in detail later. As shown in FIG. 1, the LDA control section 12 supplies the corrected LDA target torque TLDAf to the switching control section 14.

The lane keeping assist control section 13 performs the lane keeping assist control. The lane keeping assist is a control for applying the steering assist torque to the steering mechanism in such a manner that a traveling position of the own vehicle C is kept in the vicinity of the target traveling line Ld, so as to support the steering operation of the driver. Hereinafter, the lane keeping assist control section 13 is referred to as an LKA control section 13, and the lane keeping assist control is referred to as LKA control.

The LKA control section 13 receives the lane information (Dc, $\theta y$, R) calculated by the lane recognition section 11 to calculate a target torque TLKA (hereinafter referred to as an "LKA target torque TLKA") to have the own vehicle C travel along the target traveling line Ld each time a predetermined time elapses. As will be described later, the LKA target torque includes a reference LKA target torque TLKAs and a corrected LKA target torque TLKAf.

When the LKA control section 13 determines that an operating condition of a lane keeping traveling support mode which will be described later is satisfied, the LKA control section 13 calculates the LKA target torque TLKA using a following formula (2) each time the predetermined time elapses.

$$TLKAs=K11\cdot(V^2/R)+K12\cdot Dc+K13\cdot\theta y \qquad (2)$$

Each of K11, K12, and K13 is control gain.

K11 is set to a positive value (k11>0) when the traveling lane curves to the left, and is set to a negative value (−k11) when the traveling lane curves to the right.

K12 is set to a positive value.

K13 is set to a positive value.

The first term on the right side of formula (2) is a torque component (feedforward control amount with respect to the curve radius R) determined according to the curve radius R of the road (target traveling line Ld) and the vehicle speed V. The torque component acts in a feedforward control manner with respect to the curve radius R. That is, the first term on the right side is a torque component to have the own vehicle C travel according to the curvature of the target traveling line Ld.

The second term on the right side of the formula (2) is a torque component (feedback control amount with respect to the center distance Dc) which acts in a feedback control manner so as to reduce a magnitude of the center distance Dc which is a deviation (position deviation) of the position of the own vehicle in the road width direction from the target traveling line Ld.

The third term on the right side of the formula (2) is a torque component (feedback control amount with respect to the yaw angle θy) which acts in a feedback control manner so as to reduce the magnitude |θy| of the yaw angle θy (that is, so as to reduce the deviation of the direction of the own vehicle with respect to the target traveling line Ld).

Further, the LKA control section 13 calculates the corrected LKA target torque TLKAf by multiplying the reference LKA target torque TLKAs by the LKA control gain GLKA. This point will be described in detail later.

The LKA control section 13 supplies the corrected LKA target torque TLKAf to the switching control section 14.

Here, as described above, the LKA control is the control for supporting the steering operation of the driver so that the own vehicle C travels along the target traveling line Ld. Therefore, it is required that the steering feel when the LKA control is being performed is good and comfortable. For this reason, the steering assist torque (the reference LKA target torque TLKAs) is set to a value which causes a slow/moderate steering. On the other hand, the LDA control is a control to support/assist the steering operation of the driver by applying the steering assist torque to the steering mechanism so as to prevent the own vehicle C from deviating from the traveling lane when the own vehicle C is about to deviate from the traveling lane (to the outside of the objective white line). Therefore, the steering assist torque (the reference LDA target torque TLDAs) is set to a value which causes (allows) a relatively steep/rapid steering.

For these reasons, a change rate of the target value (the target torque) of the steering assist torque (i.e., a change amount in the target torque per unit time) in the LDA control is set to be larger than that in the LKA control. That is, the absolute value of the control gain used in the LDA control is set to be larger than the control gain used in the LKA control. In particular, with respect to the control gains K2 and K12 of the feedback control term of the positional deviation are set to have a relationship of K2>K12, and the control gains K3 and K13 of the feedback control term of the direction deviation are set to have a relationship of K3>K13.

Further, when the LDA control or the LKA control is performed, the lateral acceleration is generated in the own vehicle C. In the present apparatus, the LDA control or the LKA control is performed in such a manner that the magnitude of the lateral acceleration Gy does not exceed a predetermined upper limit value.

That is, the corrected LDA target torque TLDAf finally determined in the LDA control is determined (set) in such a manner that the magnitude of the actual lateral acceleration Gy does not exceed a maximum lateral acceleration GyLDAmax. In other words, the maximum lateral acceleration GyLDAmax is the maximum value of "the magnitude of the actual lateral acceleration Gy that is allowed to be generated" by the LDA control. Hereinafter, an upper limit value of the LDA target torque TLDA restricted by the maximum lateral acceleration GyLDAmax is referred to as an "upper limit torque TLDAmax".

Similarly, the corrected LKA target torque TLKAf finally determined in the LKA control is determined (set) in such a manner that the magnitude of the actual lateral acceleration Gy does not exceed the maximum lateral acceleration GyLKAmax. In other words, the maximum lateral acceleration GyLKAmax is the maximum value of "the magnitude the actual lateral acceleration Gy that is allowed to be generated" by the LKA control. The maximum lateral acceleration GyLKAmax is set to a value smaller than the maximum lateral acceleration GyLDAmax. Hereinafter, the upper limit value of the corrected LKA target torque TLKAf restricted by the maximum lateral acceleration GyLKAmax is referred to as an "upper limit torque TLKAmax".

The switching control section 14 receives the corrected LDA target torque TLDAf and the corrected LKA target torque TLKAf from the LDA control section 12 and the LKA control section 13, respectively, every time the predetermined time elapses. Further, the switching control section 14 selects the target torque having a larger magnitude (absolute value) among the corrected LDA target torque TLDAf and the corrected LKA target torque TLKAf to transmit the steering command which can specify the selected target torque to the EPS•ECU 20. Therefore, the LDA control and the LKA control are not performed at the same time. In other words, the switching control section 14 switches controls for realizing the lane keeping traveling support between the LDA control and the LKA control.

The operation switch 50 is provided on a steering column of the own vehicle. The operation switch 50 moves to an ON position when it is pushed downward by the driver, and remains at the ON position unless the driver operates it thereafter. Further, the operation switch 50 moves to an OFF position when it is pushed upward by the driver from the ON position, and remains at the OFF position unless the driver operates it thereafter. The operation switch 50 is an operation device for selecting whether or not the driver accepts the lane keeping traveling support. The driving support ECU 10 recognizes that the state of the operation switch 50 is in an ON state when the operation switch 50 is at the ON position and recognizes that the state of the operation switch 50 is at an OFF state when the operation switch 50 is at the OFF position.

Although illustration and detailed description are omitted, the driving support ECU 10 is capable of performing the well-known trailing inter-vehicle (distance) control (hereinafter referred to as an "ACC (Adaptive Cruise Control)"). The own vehicle includes an ACC operation switch (not shown) for enabling the driver to select whether or not to perform the ACC, and a radar sensor (not shown). When the ACC operation switch is set to an ON position, the ACC control is performed by the driving support ECU 10. When the ACC operation switch is set to an OFF position, the ACC control is not performed. It should be noted that the ACC is a control for performing a follow-up/trailing control for maintaining the inter-vehicle distance with other vehicle at a predetermined distance when the ACC determines that there is other vehicle which is ahead of the own vehicle and which the own vehicle should follow. Further, the ACC is a control for performing a constant speed control for causing the own vehicle to travel at a predetermined speed when it is determined that there is no other vehicle that the own vehicle should follow ahead of the own vehicle based on the target information detected by the radar sensor. The ACC itself is well known (for example, refer to Japanese Unexamined Patent Publication No. 2014-148293, Japanese Patent No. 4172434, and Japanese Patent No. 4929777).

The buzzer 60 and the display unit 70 are connected to the driving support ECU 10. The driving support ECU 10 sounds the buzzer 60 by transmitting a command to the buzzer 60, thereby alerting the driver. Further, the driving support ECU 10 has the display unit 70 display a operation status of the lane keeping traveling support by transmitting a command to the display unit 70.

<Outline of Operation>

When the following operating condition (hereinafter also referred to as a "specific operation condition") of a lane keeping traveling support mode is satisfied, the driving support ECU 10 performs one of the LDA control and the LKA control, thereby performing the lane keeping traveling support.

The specific operation condition

The ACC is being performed, the state of the operation switch 50 is in the ON state, and the vehicle speed of the own vehicle is equal to or higher than the predetermined threshold vehicle speed.

It should be noted that the predetermined threshold vehicle speed in the specific operation condition can be set to an arbitrary vehicle speed. However, when the ACC is configured in such a manner that it can be performed only when the vehicle speed is equal to or higher than an ACC allowable vehicle speed, the predetermined threshold vehicle speed in the specific operation condition is set to the vehicle speed equal to or higher than the ACC allowable vehicle speed. Further, the specific operation condition is not limited to the above-described conditions. For example, the specific operation condition may be a condition which is satisfied when the vehicle speed of the own vehicle is equal to or higher than the predetermined threshold vehicle speed, regardless of whether ACC is being performed or not.

Hereinafter, an operation when the driving support ECU 10 performs the lane keeping traveling support will be described. Here, a situation (situation1) where there is no operation (the steering operation) of the steering wheel SW by the driver will be described firstly, and then, a situation (situation2) where there is the steering operation by the driver will be described.

<The Situation1: When there is No the Steering Operation>

Figure 5:
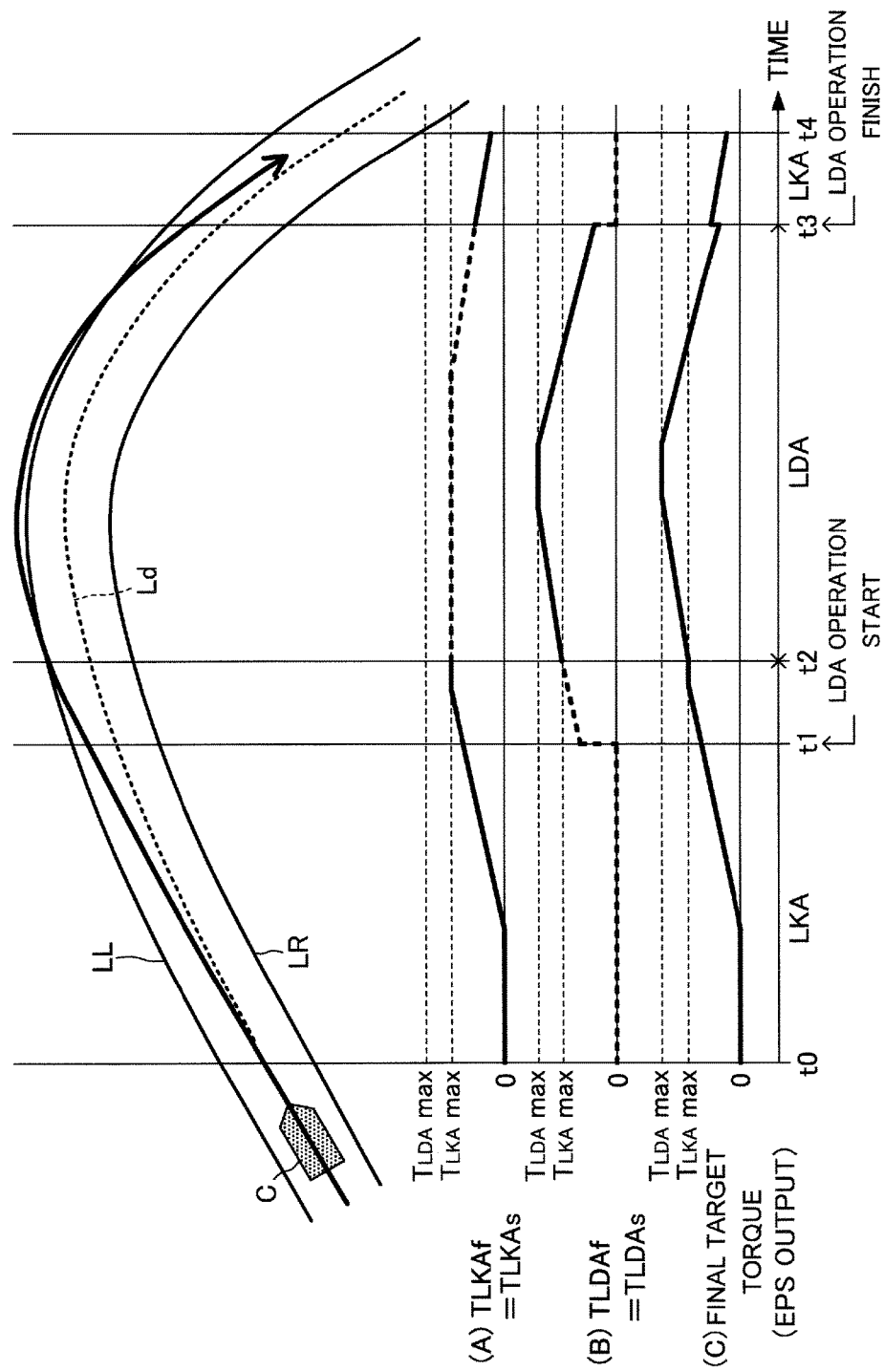
FIG. 5 is a graph showing relationship between a traveling position of an own vehicle and target torques.

In the situation1, the driving support ECU 10 sets each of "the LKA control gain GLKA and the LDA control gain GLDA" to "1". Therefore, the reference LKA target torque TLKAs is equal to the corrected LKA target torque TLKAf, and the reference LDA target torque TLDAs is equal to the corrected LDA target torque TLDAf. FIG. 5 shows the traveling position of the own vehicle C and each of the target torques in the lane keeping traveling support in one example belonging to the situation 1. In FIG. 5, a torque waveform of an upper section (A) shows "the corrected LKA target torque TLKAf equal to the reference LKA target torque TLKAs", and a torque waveform of an middle section (B) shows "the corrected LDA target Torque TLDAf equal to the reference LDA target torque TLDAs". Further, a torque waveform of a lower section (C) shows the final target torque (that is, the torque selected by the switching control section 14) specified by the steering command transmitted from the driving support ECU 10 to the EPS•ECU 20. Therefore, the actual steering assist torque changes along the torque waveform of the lower section (C).

In this example, it is assumed that the traveling lane of the own vehicle C includes a curve section curving to the right, and the specific operation condition described above is satisfied at time t0. During a period (the period from time t0 to time t4) in which the own vehicle C travels on the road section including the curve section, the driving support ECU 10 selects one of the LKA control and the LDA control according to the traveling situation of the own vehicle C to perform either one of the LKA control and the LDA control, as will be described below.

In the situation1, the LKA control section 13 calculates the reference LKA target torque TLKAs based on the formula (2) every time the predetermined time elapses, and supplies the corrected LKA target torque TLKAf obtained by multiplying the reference LKA target torque TLKAs by the LKA control gain GLKA set to "1" to the switching control section 14. Therefore, a target torque equal to the reference LKA target torque TLKAs is supplied to the switching control section 14 during the period from time t0 to time t4.

Meanwhile, the LDA control section 12 calculates the reference LDA target torque TLDAs based on the above formula (1) during a period (hereinafter referred to as an "LDA calculation period") from the "time t1 at which the LDA calculation start condition described above is satisfied" to the "time t3 at which the LDA calculation termination condition described above is satisfied" out of the period from time t0 to time t4. Further, the LDA control section 12 supplies the corrected LDA target torque TLDAf obtained by multiplying the reference LDA target torque TLDAs by the LDA control gain GLDA set to "1" to the switching control section 14. Therefore, a target torque equal to the reference LDA target torque TLDAs is supplied to the switching control section 14 during the LDA calculation period. Further, the LDA control section 12 supplies "0" as the corrected LDA target torque TLDAf to the switching control section 14 during a period other than the LDA calculation period.

More specifically, in the example shown in FIG. 5, the own vehicle C is traveling in the vicinity of the center of the traveling lane (the vicinity of the target traveling line Ld which is positioned at a central position between the left white line LL and the right white line LR) during a period from time t0 to a time point immediately before time t1. Therefore, the side distance Ds is larger than the reference side distance Dsref. Accordingly, since the LDA calculation start condition is not satisfied during the period from time t0 to the time point just before time t1, the LDA control section 12 provisionally sets the corrected LDA target torque TLDAf to "0". As a result, the magnitude of the corrected LKA target torque TLKAf is equal to or larger than the corrected LDA target torque TLDAf. Therefore, the switching control section 14 selects the "corrected LKA target torque TLKAf equal to the reference LKA target torque TLKAs" supplied from the LKA control section 13, and transmits the steering command which can specify the corrected LKA target torque TLKAf to the EPS•ECU 20. That is, the driving support ECU 10 selects and performs the LKA control during the period from time t0 to the time point immediately before time t1.

Further, the own vehicle C enters the curve section at the time point immediately before time t1. In this case, since a curvature of the curve section is excessive with respect to the vehicle speed of the own vehicle C, the position of the own vehicle C approaches the left white line LL. Thereafter, the side distance Ds becomes equal to or less than the reference side distance Dsref at time t1. As a result, since the LDA calculation start condition is satisfied at time t1, the LDA control section 12 calculates the reference LDA target torque TLDAs based on the above formula (1) and supplies the corrected LDA target torque TLDAf equal to the reference LDA target torque TLDAs to the switching control section 14 after time t1. In the meantime, as described above, the LKA control section 13 calculates the reference LKA target torque TLKAs based on the above formula (2), and supplies the corrected LKA target torque TLKAf equal to the reference LKA target torque TLKAs to the switching control section 14.

In the example shown in FIG. 5, the corrected LKA target torque TLKAf is equal to or larger than the corrected LDA target torque TLDAf during the period from time t1 to the time point immediately before time t2. Therefore, the switching control section 14 selects the corrected LKA target torque TLKAf and transmits the steering command which can specify the corrected LKA target torque TLKAf to the EPS•ECU 20. That is, the driving support ECU 10 continues the LKA control during the period from time t1 to the time point immediately before time t2. It should be noted that in this example, the corrected LKA target torque TLKAf reaches the upper limit torque TLKAmax at a time point immediately before time t2. As a result, the corrected LKA target torque TLKAf is maintained at the upper limit torque TLKAmax after time t2.

Further, in this example, the magnitude of the corrected LDA target torque TLDAf coincides with the magnitude of the upper limit torque TLKAmax at time t2 and continues to increase thereafter. As a result, the magnitude of the corrected LDA target torque TLDAf is equal to or larger than the magnitude of the corrected LKA target torque TLKAf after time t2. Therefore, the switching control section 14 selects the corrected LDA target torque TLDAf and transmits the steering command that can specify the corrected LDA target torque TLDAf to the EPS•ECU 20 after time t2. That is, the driving support ECU 10 switches the controls from the LKA control to the LDA control to realize the lane keeping traveling support at time t2, and performs the LDA control after time t2.

In addition, in this example, at time t3, the own vehicle C approaches the end point of the curve section, and further approaches the target traveling line Ld by the yaw rate in the direction to avoid/prevent deviation of the traveling lane generated by the LDA control. As a result, the side distance Ds becomes larger than the reference side distance Dsref at time t3. Therefore, since the above-described LDA calculation termination condition is satisfied at time t3, the LDA control section 12 sets the corrected LDA target torque TLDAf to "0". As a result, the magnitude of the corrected LKA target torque TLKAf is equal to or larger than the magnitude of the corrected LDA target torque TLDAf. Therefore, the switching control section 14 selects the corrected LKA target torque TLKAf supplied from the LKA control section 13, and transmits the steering command that can specify the corrected LKA target torque TLKAf to the EPS•ECU 20. That is, the driving support ECU 10 switches the controls from the LDA control to the LKA control to realize the lane keeping traveling support at time t3, and performs the LKA control after time t3.

<The Situation 2: When there is the Steering Operation>

Next, an outline of the operation of the driving support ECU 10 in the situation (situation2) where there is the steering operation by the driver will be described, referring to FIGS. 6A and 6B.

Figure 6A:
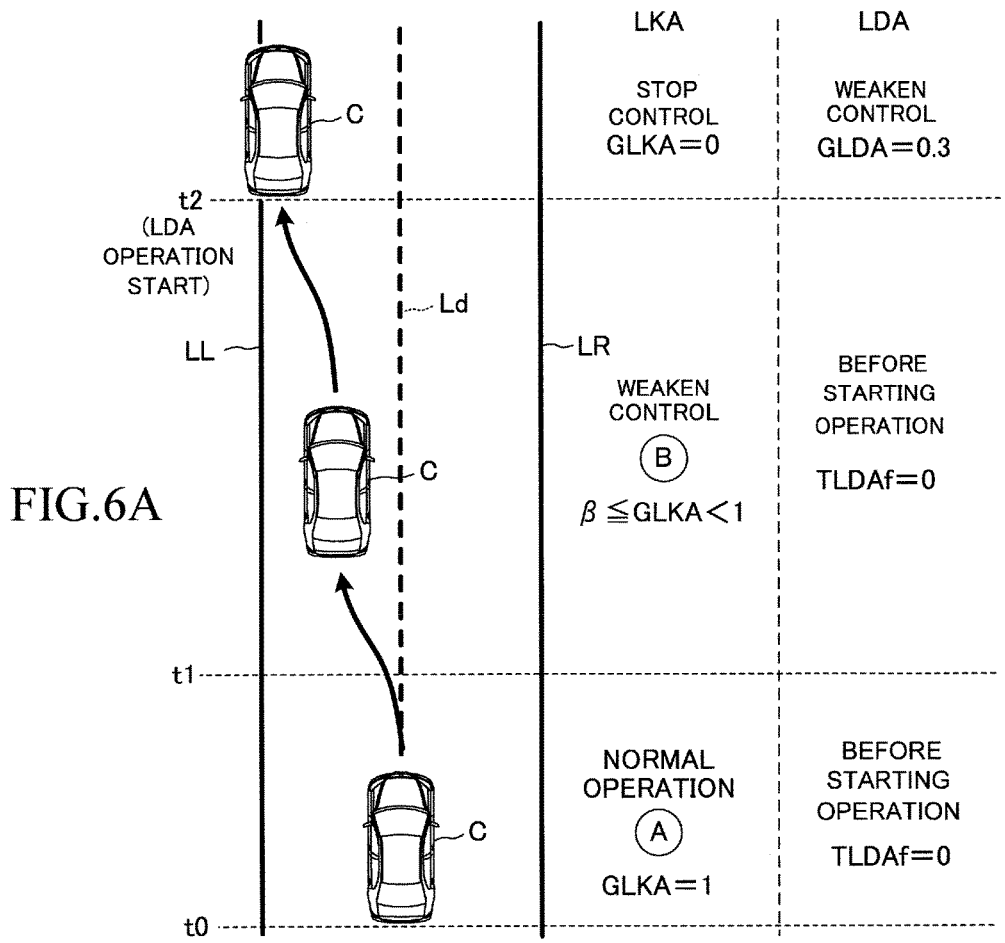
FIG. 6A is a plan view showing relationship between a traveling position of the own vehicle and a control state when a driving support ECU 10 is operating in a lane keeping traveling support mode.

FIG. 6A is a plan view showing relationship between the traveling position of the own vehicle C and the respective states of LDA control and LKA control when the driving support ECU 10 is performing the lane keeping traveling support. FIG. 69 is a graph showing relationship between the magnitude (absolute value) |TqDr| of the "driver torque TqDr detected by the steering torque sensor 51" and the LKA control gain GLKA.

Here, in a state in which the driving support ECU 10 is performing the LKA control in order to perform the lane keeping traveling support, a case arises where the driver intentionally performs the steering operation with the aim of causing the own vehicle C to deviate from the current traveling lane in an attempt to change lanes. In this case, the steering operation is performed against the steering assist torque by the LKA control.

Therefore, the driver may feel uncomfortable due to the steering assist torque acting in the opposite direction to the driver torque TqDr which the driver is giving by himself/herself. In view of this, the LKA control section 13 reduces the magnitude of the steering assist torque by the LKA control in such a case. It should be noted that, as will be described later, when the LDA control is performed in a case where such a steering operation is occurring, the magnitude of the steering assist torque by the LDA control is also reduced.

Figure 6B:
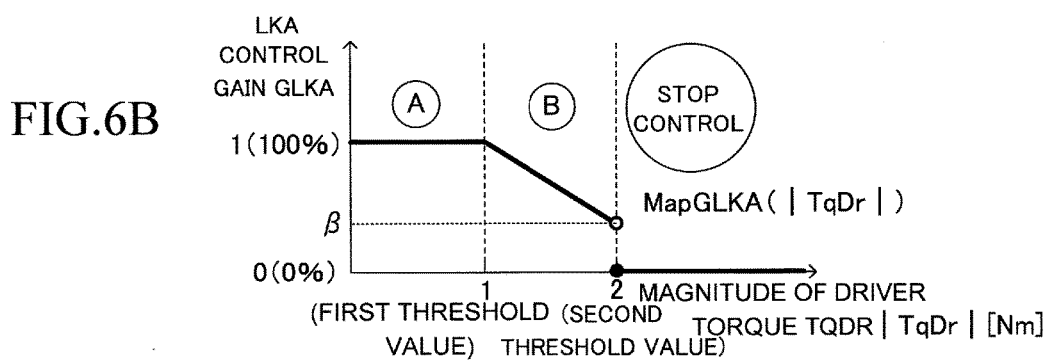
FIG. 6B is a graph showing relationship between a driver torque TqDr and a gain GLKA.

More specifically, when the steering operation by the driver is performed while the LKA control is being performed (that is, when the magnitude |TqDr| of the driver torque TqDr is larger than "0"), the LKA control section 13 determines/obtains the LKA control gain GLKA by applying the magnitude |TqDr| of the actual driver torque TqDr to a "lookup table MapGLKA (|TqDr|) shown in FIG. 6B". Further, the LKA control section 14 calculates the final corrected LKA target torque TLKAf by multiplying the reference LKA target torque TLKAs by the determined LKA control gain GLKA.

According to the lookup table MapGLKA(|TqDr|) shown in FIG. 6B, the LKA control gain GLKA is determined as described below.

When the magnitude |TqDr| of the actual driver torque TqDr is less than the first threshold value (for example, 1 [Nm]), the LKA control gain GLKA is set to 1 (100%) (referring to the region A).

When the magnitude |TqDr| of the actual driver torque TqDr is equal to or larger than the first threshold value and less than the second threshold value (for example, 2 [Nm]), the LKA control gain GLKA is set to a value which decreases from 1 to "value β between 0 and 1" as the magnitude |TqDr| increases from the first threshold value (referring to the region B). In this case, the magnitude of the corrected LKA target torque TLKAf becomes smaller than the magnitude of the reference LKA target torque TLKAs. Therefore, the magnitude of the steering assist torque for making the own vehicle C travel along the traveling line Ld by the LKA control becomes small. That is, the control effect of the LKA control is weakened.

When the magnitude |TqDr| of the actual driver torque TqDr is equal to or larger than the second threshold value, the LKA control gain GLKA is set to "0". As a result, the corrected LKA target torque TLKAf becomes "0". In other words, when the magnitude of the driver torque TqDr is equal to or larger than the second threshold value, the driving support ECU 10 stops the LKA control.

The above mentioned LKA control will be described based on the example shown in FIG. 6A. The steering operation is not performed at time t0, and the steering operation starts to be performed from immediately after time to. However, the magnitude |TqDr| of the driver torque TqDr applied to the steering wheel SW is less than the first threshold value during a period from time t0 to the time point immediately before time t1. Therefore, the LKA control gain GLKA is set to 1. Further, since the own vehicle C has not excessively approached the objective white line (the target white line) (in this case, the left white line LR) during this period, the side distance Ds is larger than the reference side distance Dsref. Therefore, the LDA calculation start condition is not satisfied. Therefore, the corrected LDA target torque TLDAf is maintained at "0". In other words, the LDA control is maintained in a non-operating state (state before starting operation). As a result, the switching control section 14 selects the "corrected LKA target torque TLKAf equal to the reference LKA target torque TLKAs" supplied from the LKA control section 13 during the period from time t0 to the time point immediately before time t1, and transmits the steering command which can specify the corrected LKA target torque TLKAf to the EPS•ECU 20. That is, the driving support ECU 10 performs the normal LKA control based on the "corrected LKA target torque TLKAf equal to the reference LKA target torque TLKAs" during this period.

In this example, the driver torque TqDr having a magnitude equal to or larger than the first threshold and less than the second threshold is applied to the steering wheel SW during a period from time t1 to the time point immediately before time t2. In this case, according to the conventional LKA control, in order to return the position of the own vehicle C to the vicinity of the target traveling line Ld, a steering assist torque is generated based on the "reference LKA target torque TLKAs having a relatively large magnitude" calculated according to the above formula (2).

In contrast, as described above, the LKA control gain GLKA becomes between "1" and "β" during the period from time t1 to the time point immediately before time t2. Therefore, the LKA control section 13 obtains the corrected LKA target torque TLKAf (smaller than the reference LKA target torque TLKAs) by multiplying the reference LKA target torque TLKAs by the LKA control gain GLKA, and supplies the corrected LKA target torque TLKAf to the switching control section 14. Further, the side distance Ds is still larger than the reference side distance Dsref during the period from time t1 to the time point immediately before time t2. Therefore, the LDA calculation start condition is not satisfied. Therefore, the corrected LDA target torque TLDAf is maintained at "0". In other words, the LDA control is maintained in the non-operating state (state before starting operation). As a result, the switching control section 14 selects "the corrected LKA target torque having a magnitude smaller than a magnitude of the reference LKA target torque TLKAs" supplied from the LKA control section 13, and transmits to the EPS•ECU 20 the steering command which can specify the corrected LKA target torque TLKAf during the period from time t1 to the time point immediately before time t2. That is, the driving support ECU 10 generates the steering assist torque based on "the corrected LKA target torque TLKAf having the magnitude which is smaller than the magnitude of the reference LKA target torque TLKAs" during this period. Thus, the driving support ECU 10 performs the LKA control whose control effect has been weakened. As a result, when the driver is performing the steering operation with the intention to change lanes, the steering wheel operation in the lane departing direction can be performed with a light force, and therefore, the driver is unlikely to feel uncomfortable.

Here, in the example shown in FIG. 6A, the driver torque TqDr having a magnitude larger than the magnitude of the steering assist torque by the LKA control is continuously applied to the steering wheel SW after time t1. As a result, the own vehicle C continues to move toward the end of the traveling lane (in this case, the left white line LL), and the side distance Ds becomes equal to or less than the reference side distance Dsref at time t2. In this case, since the above-described LDA calculation start condition is satisfied, the LDA control section 12 starts calculating the reference LDA target torque TLDAs. On the other hand, the LKA control section 13 sets the value of the corrected LKA target torque TLKAf to "0" when the LDA calculation start condition is satisfied in a state where the driver torque TqDr is not "0".

In this case, if the conventional steering assist torque (that is, the reference LDA target torque TLDAs calculated based on the above formula (1)) is generated, a steering assist torque in a direction opposite to the driver torque TqDr by the driver's steering operation and having a large magnitude is applied to the steering mechanism. Therefore, the driver is likely to feel uncomfortable. That is, there is a high possibility that the driver is likely to feel that the own vehicle C is being controlled so as to resist his/her intention.

In view of the above, according to the present apparatus, when the LDA calculation start condition is satisfied, the LDA control section 12 determines whether or not the steering operation is being performed (that is, whether or not the driver torque TqDr is generated). When the LDA control section 12 determines that the steering operation is being performed in a case where the LDA calculation start condition is satisfied, the LDA control section 12 adjusts/varies the steering assist torque in such a manner that the magnitude of the "steering assist torque by the LDA control" is smaller than the steering assist torque by the conventional LDA control.

More specifically, the LDA control section 12 calculates the corrected LDA target torque TLDAf by multiplying the reference LDA target torque TLDAs calculated according to the formula (1) by the LDA control gain GLDA having a predetermined value α (for example, α=0.3 (30%)), and transmits the corrected LDA target torque TLDAf to the switching control section 14. It should be noted that the value α is set to a suitable value within a range larger than 0 and smaller than 1.

Also in this case, the switching control section 14 selects the target torque having a larger magnitude among the corrected LDA target torque TLDAf supplied from the LDA control section 12 and the corrected LKA target torque TLKAf supplied from the LKA control section 13, to transmit the steering command representing the selected target torque to the EPS•ECU 20. As described above, the corrected LKA target torque TLKAf is set to "0" under this situation. Therefore, the switching control section 14 selects the corrected LDA target torque TLDAf, and transmits the steering command which can specify the corrected LDA target torque TLDAf to the EPS•ECU 20. As a result, the LKA control is effectively/substantially prohibited (stopped) and the LDA control is performed. That is, the driving support ECU 10 switches the control for realizing the lane keeping traveling support from the LKA control to the LDA control at time t2 and performs the LDA control with weakening the control effect of the LDA control. As a result, when the driver is performing the steering operation with the intention to change lanes, the steering wheel operation in the lane departing direction can be performed with a light force, and thus, the driver is unlikely to feel uncomfortable.

In this manner, the present apparatus weakens the control effect of the LDA control when an intentional steering wheel operation by the driver who is attempting to depart from the traveling lane is performed. That is, the present apparatus reduces the magnitude of the steering assist torque in the direction opposite to the direction of the steering torque provided by such a driver's steering wheel operation. As a result, the present apparatus can reduce the possibility that the LDA control causes the driver to feel uncomfortable. Therefore, the present apparatus can perform the lane keeping traveling support which allows the intention of the steering operation by the driver to be easily reflected in changing the traveling direction of the own vehicle (that is, the present apparatus can perform the lane keeping traveling support having a high receptivity for the driver's intentional steering operation). Further, as a result, the present apparatus can reduce the possibility that the driver's acceptability for the lane keeping traveling support provided by the present system will be reduced.

<Specific Operation>

Next, a specific operation of the present apparatus will be described. The CPU of the driving support ECU 10 (hereinafter simply referred to as the "CPU") executes a lane keeping traveling support routine shown by a flowchart in FIG. 7 every time a predetermined time elapses.

Figure 7:
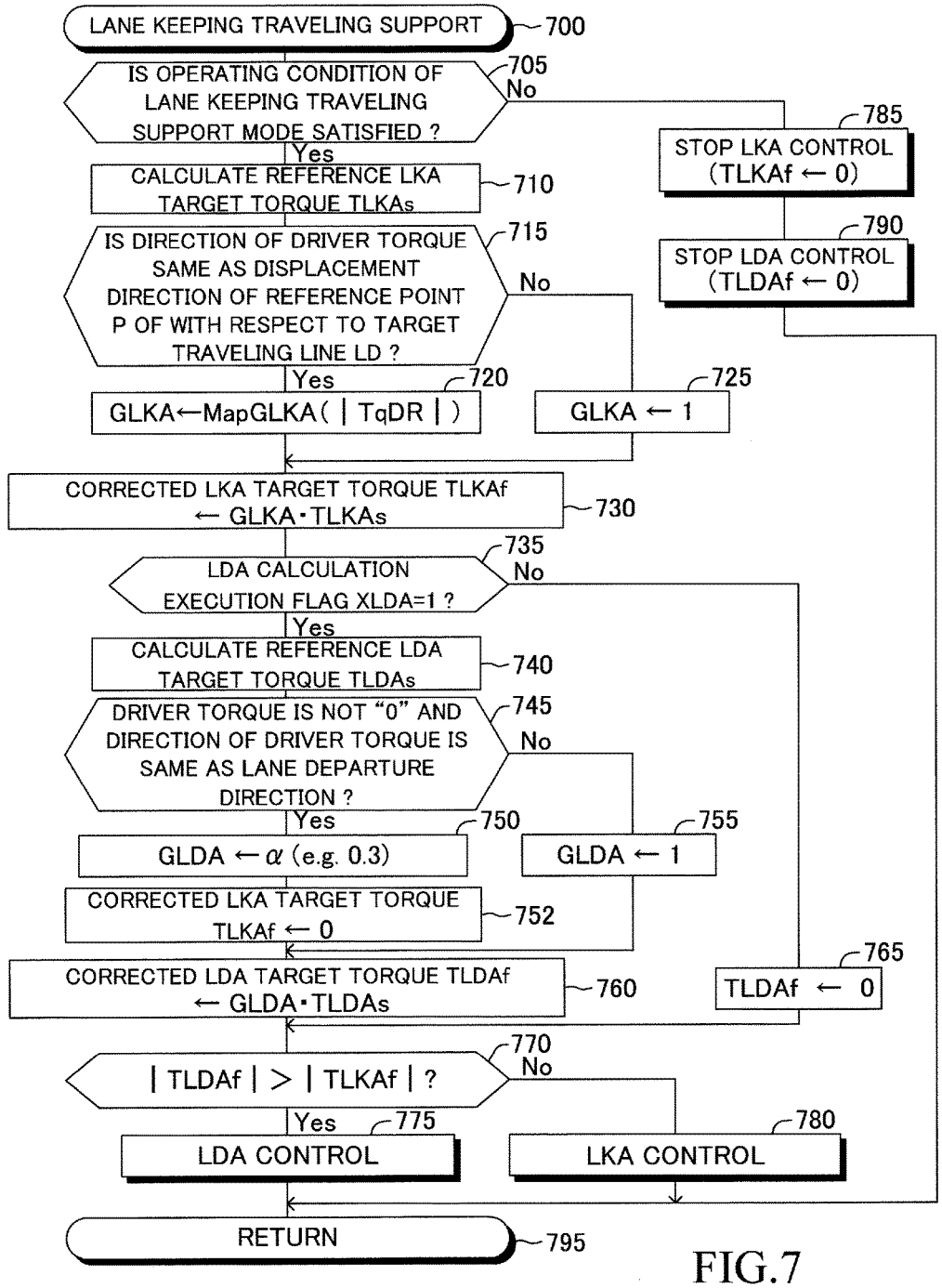
FIG. 7 is a flowchart showing a lane keeping traveling support mode routine executed by a CPU of the driving support ECU.

Therefore, when an appropriate time point arrives, the CPU starts processing from step 700 in FIG. 7 and proceeds to step 705 to determine whether or not the above-described operating condition (i.e., the specific operating condition) of the lane keeping traveling support mode is satisfied.

When the operating condition of the lane keeping traveling support mode is satisfied, the CPU makes a "Yes" determination at step 705 and proceeds to step 710 to calculate the reference LKA target torque TLKAs according to the above formula (2).

Next, the CPU proceeds to step 715 to determine whether or not the direction of the "driver torque TqDr detected by the steering torque sensor 51" (that is, the steering direction by the steering wheel SW) is the same as the displacement direction of the reference point P of the own vehicle with respect to the target traveling line Ld. That is, for example, the determination condition at step 715 is satisfied, when the steering direction of the steering wheel SW is the direction to have the own vehicle turn to the left and the reference point P is displaced/positioned in the left side area with respect to the target traveling line Ld (that is, the center distance Dc is negative). Similarly, the determination condition at step 715 is satisfied, when the steering direction of the steering wheel SW is the direction to have the own vehicle turn to the right and the reference point P is displaced/positioned in the right side area with respect to the target traveling line Ld (that is, the center distance Dc is positive).

When the determination condition at step 715 is satisfied, the CPU makes a "Yes" determination at step 715 and proceeds to step 720 to calculate the LKA control gain GLKA by applying the driver torque TqDr detected by the steering torque sensor 51 to the lookup table MapGLKA (|TqDr|) shown in FIG. 6B. Thereafter, the CPU proceeds to step 730.

In contrast, when the determination condition at step 715 is not satisfied (this case includes the case where the driver torque TqDr detected by the steering torque sensor 51 is "0"), the CPU makes a "No" determination at step 715. In this case, the CPU proceeds to step 725 and sets the LKA control gain GLKA to "1" at step 725 to proceed to step 730.

The CPU calculates the product of the LKA control gain GLKA and the reference LKA target torque TLKAs so as to obtain the corrected LKA target torque TLKAf at step 730. Next, the CPU proceeds to step 735 to determine whether or not the value of the LDA calculation execution flag XLDA is "1". The value of the LDA calculation execution flag XLDA is set by the LDA calculation execution flag setting routine shown in FIG. 8 which will be described later. Briefly, the value of the LDA calculation execution flag XLDA is set to "1" when the LDA calculation start condition is satisfied and to "0" when the LDA calculation termination condition is satisfied. Further, the value of the LDA calculation execution flag XLDA is set to "0" in an initialization routine (not shown) executed by the CPU when the ignition key switch (not shown) of the own vehicle is changed from the OFF position to the ON position.

When the value of the LDA calculation execution flag XLDA is "1", the CPU makes a "Yes" determination at step 735 and proceeds to step 740 to calculate the reference LDA target torque TLDAs according to the above formula (1).

Next, the CPU proceeds to step 745, and determines whether or not the "driver torque TqDr detected by the steering torque sensor 51" is not "0" and the direction of the driver torque TqD (that is, the steering direction by the steering wheel SW) is the same as the lane departure direction. That is, for example, the determination condition at step 745 is satisfied, when the steering direction of the steering wheel SW is the direction to have the own vehicle turn to the left and the objective white line is the left white line LL. Similarly, the determination condition at step 745 is satisfied, when the steering direction of the steering wheel SW is the direction to have the own vehicle turn to the right and the objective white line is the right white line LR.

When the determination condition at step 745 is satisfied, the CPU makes a "Yes" determination at step 745 and proceeds to step 750 to set the LDA control gain GLDA to the predetermined value α (in the example, the predetermined value α is 0.3) larger than 0 and smaller than 1. Next, the CPU proceeds to step 752 to set the corrected LKA target torque TLKAf to "0". Thereby, the LKA control is effectively/substantially prohibited (stopped). Thereafter, the CPU proceeds to step 760.

In contrast, when the determination condition of step 745 is not satisfied (this case includes the case where the driver torque TqDr detected by the steering torque sensor 51 is "0"), the CPU makes a "No" determination at step 745. In this case, the CPU proceeds to step 755 to set the LDA control gain GLDA to "1" at step 755 and proceeds to step 760.

The CPU calculates the product of the LDA control gain GLDA and the reference LDA target torque TLDAs so as to obtain the corrected LDA target torque TLDAf at step 760 and proceeds to step 770.

In contrast, when the value of the LDA calculation execution flag XLDA is "0" at the time point at which the CPU executes the process of step 735, the CPU makes a "No" determination at step 735 and proceeds to step 765 to set the corrected LDA target torque TLDAf to "0". Thereby, the LDA control is effectively/substantially prohibited (stopped). Thereafter, the CPU proceeds to step 770.

The CPU determines whether or not the magnitude |TLDAf| of the corrected LDA target torque TLDAf is larger than the magnitude |TLKAf| of the corrected LKA target torque TLKAf at step 770.

When the magnitude |TLDAf| of the corrected LDA target torque TLDAf is larger than the magnitude |TLKAf| of the corrected LKA target torque TLKAf, the CPU makes a "Yes" determination at step 770 and proceeds to step 775 to perform the LDA control based on the corrected LDA target torque TLDAf. That is, the CPU transmits the steering command which can specify the corrected LDA target torque TLDAf to the EPS•ECU 20, thereby generating a steering assist torque equal to the corrected LDA target torque TLDAf. Thereafter, the CPU proceeds to step 795 to tentatively terminate the present routine.

In contrast, when the magnitude |TLDAf| of the corrected LDA target torque TLDAf is equal to or smaller than the magnitude |TLKAf| of the corrected LKA target torque TLKAf, the CPU makes a "No" determination at step 770 and proceeds to step 780 to perform the LKA control based on the target torque TLKAf. That is, the CPU transmits the steering command which can specify the corrected LKA target torque TLKAf to the EPS•ECU 20, thereby generating a steering assist torque equal to the corrected LKA target torque TLKAf. Thereafter, the CPU proceeds to step 795 to tentatively terminate the present routine.

When the operating condition of the lane keeping traveling support mode is not satisfied at the time point at which the CPU executes the process of step 705, the CPU makes a "No" determination at step 705, and executes the processes of steps 785 and 790 described below to proceed to step 795 to tentatively terminate the present routine.

Step 785: the CPU stops the LKA control.

In this case, the CPU sets the corrected LKA target torque TLKAf to "0".

Step 790: the CPU stops the LDA control.

In this case, the CPU sets the corrected LDA target torque TLDAf to "0".

Figure 8:
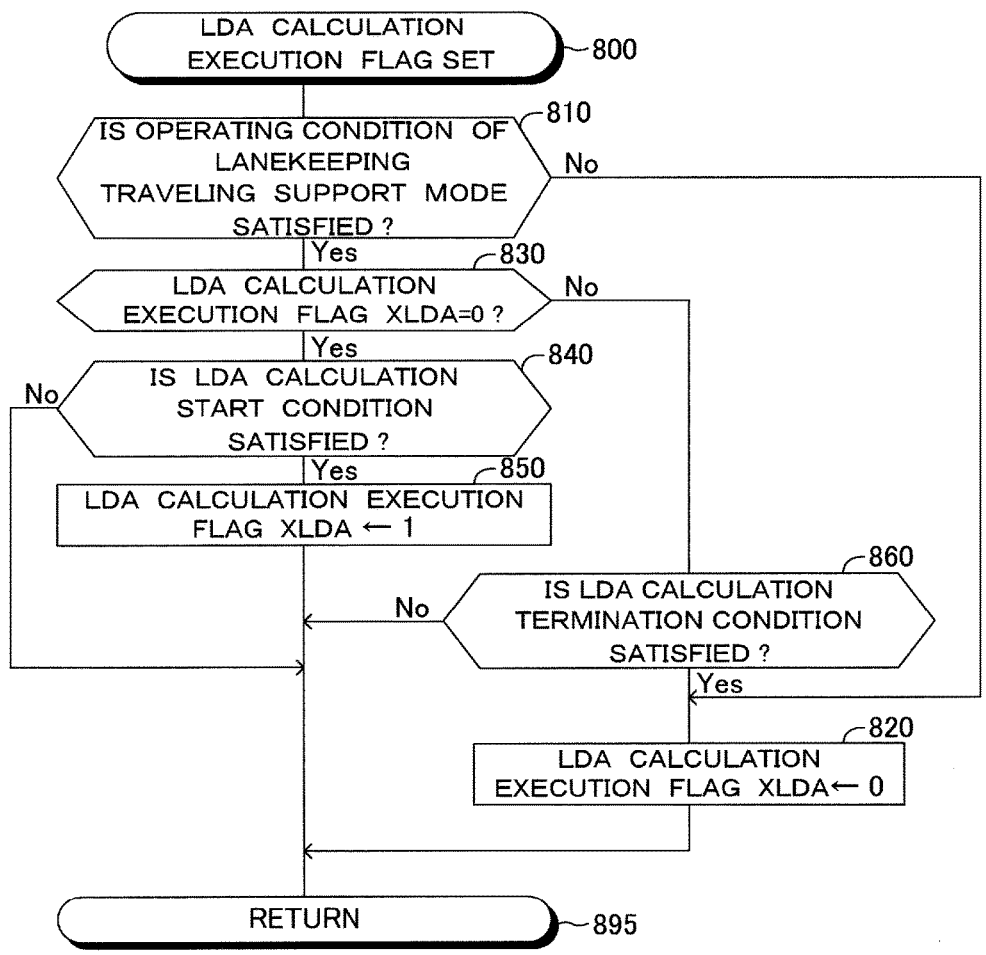
FIG. 8 is a flowchart showing an LDA operation execution flag setting routine executed by the CPU of the driving support ECU.

Further, the CPU executes the "LDA calculation execution flag setting routine" shown by a flowchart in FIG. 8 every time the predetermined time elapses. Therefore, when an appropriate timing arrives, the CPU starts processing from step 800 in FIG. 8 and proceeds to step 810 to determine whether or not the above-described operating condition of the lane keeping traveling support mode (that is, the specific operating condition) is satisfied.

When the specific operating condition is not satisfied, the CPU makes a "No" determination at step 810 and proceeds to step 820 to set the value of the LDA calculation execution flag XLDA to "0". Thereafter, the CPU proceeds to step 895 to tentatively terminate the present routine.

In contrast, when the specific operating condition is satisfied, the CPU makes a "Yes" determination at step 810 and proceeds to step 830 to determine whether or not the value of the LDA calculation execution flag XLDA is "0" at the present time.

When the value of the LDA calculation execution flag XLDA is "0", the CPU makes a "Yes" determination at step 830 and proceeds to step 840 to determine whether or not the LDA calculation start condition described above is satisfied. When the LDA calculation start condition is not satisfied, the CPU makes a "No" determination at step 840 and proceeds directly to step 895 to tentatively terminate the present routine.

In contrast, when the LDA calculation start condition is satisfied at the time point at which the CPU executes the process of step 840, the CPU makes a "Yes" determination at step 840 and proceeds to step 850 to set the value of the LDA calculation execution flag XLDA to "1". Thereafter, the CPU proceeds to step 895 to tentatively terminate the present routine.

In contrast, when the value of the LDA calculation execution flag XLDA is not "0" (that is, "1") at the time point at which the CPU executes the process of step 830, the CPU makes a "No" determination at step 830 and proceeds to step 860 to determine whether or not the LDA calculation termination condition described above is satisfied.

When the LDA calculation termination condition is not satisfied, the CPU makes a "No" determination at step 860 and proceeds to step 895 to tentatively terminate the present routine. In contrast, the LDA calculation termination condition is satisfied, the CPU makes a "Yes" determination at step 860 and proceeds to step 820 to set the value of the LDA calculation execution flag XLDA to "0". Thereafter, the CPU proceeds to step 895 to tentatively terminate the present routine.

As described above, the present apparatus weakens the control effect of the LDA control when the driver performs an intentional steering wheel operation which causes the own vehicle to deviate from the traveling lane. That is, the present apparatus decreases the magnitude of the steering assist torque in the direction which obstructs the driver's intentional steering wheel operation. Thereby, the present apparatus can reduce the possibility that the LDA control causes the driver to feel uncomfortable. Therefore, the present apparatus can perform the lane keeping traveling support which allows the intention of the steering operation by the driver to be easily reflected in changing the traveling direction of the own vehicle (that is, the present apparatus can perform the lane keeping traveling support having a high receptivity for the driver's intentional steering operation). Further, as a result, the present apparatus can reduce the possibility that the driver's acceptability for the lane keeping traveling support provided by the present system is reduced.

Modified Examples

Although the embodiment of the present invention has been specifically described above, the present invention is not limited to the above embodiment, and various modified examples based on the technical idea within the scope of the present invention can be adopted.

The above-described present apparatus is said to be configured as follows, when the specific driving situation arises where the own vehicle is likely to deviate from the traveling lane (i.e., when the LDA calculation start condition is satisfied), and when it is determined that the steering of the steering wheel SW is performed by the driver of the own vehicle in such a manner that the own vehicle faces (heads to) the lane departing direction. That is, in such a case, the above-described present apparatus calculates the corrected LDA target torque TLDAf by multiplying the reference LDA target torque TLDAs calculated using the formula (2) by the LDA control gain GLDA set to the value α larger than "0" and smaller than "1", and generates the steering assist torque equal to the corrected LDA target torque TLDAf so as to weaken the LDA control which interferes with the operation of the steering wheel by the driver.

In contrast, a first modified example of the present apparatus is configured to prohibit the LDA control (or is configured not to perform the LDA control) which interferes with the operation of the steering wheel by the driver (or which generates an assist torque acting in the direction opposite to the steering direction of the operation of the steering wheel SW), when the specific driving situation occurs where the own vehicle is likely to deviate from the traveling lane, and when it is determined that the steering of the steering wheel SW is performed by the driver of the own vehicle in such a manner that the own vehicle faces (heads to) the lane departing direction.

In this first modified example, the LDA control section 12 is configured to terminate the calculation of "the reference LDA target torque TLDAs and the corrected LDA target torque TLDAf" and stop supplying the reference LDA target torque TLDAs and the corrected LDA target torque TLDAf to the switching control section 14, so as to prohibit the LDA control. It should be noted that the first modified example of the present apparatus may continue performing the LKA control when it prohibits the LDA control as described above.

Further, a second modified example of the present apparatus is configured to set the LDA control gain GLDA to "0", and to calculate the corrected LDA target torque TLDAf to be "0" by multiplying the reference LDA target torque TLDAs calculated using the formula (2) by the LDA control gain GLDA set to "0", to supply the corrected LDA target torque TLDAf (that is, "0") to the switching control section 14, when the specific driving situation arises where the own vehicle is likely to deviate from the traveling lane and when it is determined that the steering of the steering wheel SW is performed by the driver of the own vehicle in such a manner that the own vehicle faces (heads to) the lane departing direction. According to this second modified example, the LDA control is substantially prohibited (stopped). It should be noted that the second modification may continue performing the LKA control when the LDA control is substantially prohibited.

Each of the first and second modified examples of the present apparatus prohibits the LDA control which interferes with the operation of the steering wheel by the driver (or which acts in the direction opposite to the steering direction of the steering wheel operation of the driver), when the steering of the steering wheel SW is performed by the driver of the own vehicle in such a manner that the own vehicle faces (heads to) the lane departing direction. Thereby, since the LDA control that acts in the direction opposite to the steering direction of the operation of the steering wheel is not performed, each of the first and second modified examples of the present apparatus can reduce the possibility that the LDA control causes the driver to feel uncomfortable. In other words, each of the first and second modified examples of the present apparatus can perform the lane keeping traveling support with high acceptability for the driver's intentional steering operation. Further, as a result, each of the first and second modified examples of the present apparatus can reduce the possibility that the driver's acceptability for the lane keeping traveling support provided by each of the first and second modified examples is reduced.

What is claimed is:

1. A lane keeping traveling support apparatus comprising:
    an electric motor for applying a steering assist torque to a steering mechanism for changing a turning angle of steered wheels of an own vehicle;
    a lane recognition section:
        for recognizing a pair of lane markers that defines a traveling lane in which said own vehicle is traveling;
        for setting a target traveling line based on said lane markers; and
        for obtaining lane information including a position and a direction of said own vehicle with respect to said lane markers and said target traveling line; and
    a control unit for selectively performing one of:
        a lane keeping assist control:
            for determining a lane keeping support torque which is said steering assist torque to keep a traveling position of said own vehicle in the vicinity of said target traveling line based on said lane information; and
            for applying said determined lane keeping support torque to said steering mechanism by using said electric motor; and
        a lane departure prevention control:
            for determining, based on said lane information, a lane departure prevention torque which is said steering assist torque to change a direction of said own vehicle to a direction opposite to a lane departure direction which is a direction of said own vehicle when deviating from said traveling lane so as to prevent said own vehicle from deviating from said traveling lane, when a specific traveling situation occurs in which said own vehicle is likely to deviate from said traveling lane to outside of said traveling lane, said lane departure prevention torque having a magnitude larger than a magnitude of said lane keeping support torque determined when it is assumed that said lane keeping support control is being performed under said specific traveling situation; and
            for applying said determined lane departure prevention torque to said steering mechanism by using said electric motor,
    the control unit configured to perform said lane departure prevention control instead of said lane keeping assist control, when said specific driving situation occurs while said lane keeping support control is being performed by said control unit,
    wherein,
    the control unit is configured to:
        determine said lane departure prevention torque, when said specific driving situation occurs and a specific operation of a steering wheel is performed by said driver so as to have said direction of said own vehicle head to said lane departure direction, in such a manner that a magnitude of said lane departure prevention torque becomes smaller than a magnitude of said lane departure prevention torque when said specific operation of said steering wheel is not performed by said driver; or
        stop performing said lane departure prevention control, when said specific driving situation occurs and said specific operation of said steering wheel is performed by said driver.

2. The lane keeping traveling support apparatus according to claim 1,
    wherein,
        said control unit is configured, when performing said lane departure prevention control:
            to determine a reference LDA target torque which is a basic value of said lane departure prevention torque based on said lane information;
            to calculate a corrected LDA target torque by multiplying said reference LDA target torque by an LDA control gain larger than 0 and smaller than 1, when said specific driving situation occurs and said specific operation of said steering wheel is performed by said driver; and
            to set said reference LDA target torque as said corrected LDA target torque, when said specific driving situation occurs and said specific operation of said steering wheel is not performed by said driver; and
            to use said corrected LDA target torque as said lane departure prevention torque.

3. The lane keeping traveling support apparatus according to claim 1,
    wherein,
        said control unit is configured, when said specific driving situation occurs and said specific operation of said steering wheel is performed by said driver:
            to stop performing said lane departure prevention control; and
            to perform said lane keeping assist control instead of said stopped lane departure prevention control.

4. The lane keeping traveling support apparatus according to claim 1,
wherein,
said control unit is configured, when performing said lane keeping assist control:
to calculate a reference LKA target torque which is a basic value of said lane keeping support torque based on said lane information;
to calculate a corrected LKA target torque by multiplying said reference LKA target torque by a LKA control gain which becomes smaller within a range from 0 to 1 as a magnitude of a driver torque which is a torque applied to said steering wheel by said driver increases; and
to use said corrected LKA target torque as said lane keeping support torque.

* * * * *